(12) United States Patent
Cascioli

(10) Patent No.: US 11,138,159 B1
(45) Date of Patent: Oct. 5, 2021

(54) DATABASE ACCESS GATEWAY THROUGH DISTRIBUTED NETWORKS

(71) Applicant: ARCHITECTURE TECHNOLOGY CORPORATION, Eden Prairie, MN (US)

(72) Inventor: Joseph Cascioli, Ithaca, NY (US)

(73) Assignee: ARCHITECTURE TECHNOLOGY CORPORATION, Eden Prairie, MN (US)

( * ) Notice: Subject to any disclaimer, the term of this patent is extended or adjusted under 35 U.S.C. 154(b) by 0 days.

(21) Appl. No.: 16/780,618

(22) Filed: Feb. 3, 2020

(51) Int. Cl.
| | | |
|---|---|---|
| *G06F 15/16* | (2006.01) | |
| *G06F 16/182* | (2019.01) | |
| *G06F 16/14* | (2019.01) | |
| *H04L 9/06* | (2006.01) | |
| *G06F 21/62* | (2013.01) | |
| *G06F 21/32* | (2013.01) | |
| *G06F 16/13* | (2019.01) | |

(52) U.S. Cl.
CPC ........ *G06F 16/1834* (2019.01); *G06F 16/137* (2019.01); *G06F 16/144* (2019.01); *G06F 16/156* (2019.01); *G06F 21/32* (2013.01); *G06F 21/6218* (2013.01); *H04L 9/0637* (2013.01)

(58) Field of Classification Search
None
See application file for complete search history.

(56) References Cited

U.S. PATENT DOCUMENTS

| | | | | |
|---|---|---|---|---|
| 2019/0013933 | A1* | 1/2019 | Mercuri | G06N 20/00 |
| 2019/0020648 | A1* | 1/2019 | Haque | H04L 63/108 |
| 2019/0288850 | A1* | 9/2019 | Beecham | G06F 21/6227 |
| 2020/0210519 | A1* | 7/2020 | Wang | H04L 9/0618 |
| 2020/0259643 | A1* | 8/2020 | Pazhoor | H04L 9/3239 |
| 2020/0304289 | A1* | 9/2020 | Androulaki | G06F 21/64 |
| 2020/0322136 | A1* | 10/2020 | Irazabal | H04L 9/3247 |
| 2020/0389313 | A1* | 12/2020 | Singh | G06F 16/9024 |

FOREIGN PATENT DOCUMENTS

WO WO-2018031940 A1 * 2/2018 ......... G06F 21/6218

OTHER PUBLICATIONS

Joseph Cascioli, Phase I SBIR Proposal, "IBIS—International Biometric Screening," Topic and Number and Name: A19-078—Data Sharing and Encryption, Feb. 6, 2019, 22 pages.

* cited by examiner

*Primary Examiner* — Phyllis A Book

(74) *Attorney, Agent, or Firm* — Foley & Lardner LLP

(57) ABSTRACT

A plurality of interconnected distributed networks each having a plurality of distributed network nodes provide a decentralized access gateway to multiple, diverse types of databases. Each distributed network may be a structured distributed network having at least two tiers of nodes comprising validator nodes that may implement gossip protocols to cooperatively validate one or more database operations and generate new blocks and host nodes that may receive the new block and update a corresponding local copy. Each distributed network may correspond to different attributes and may be interconnected to increase query efficiency. To access/query data, parallel queries may be performed on more than one distributed networks.

20 Claims, 8 Drawing Sheets

```
400
```

A network node of a plurality of distributed network nodes hosting a private party blockchain performs a database operation associated with a secure database
402

Validator nodes gossip information associated with the database operation with each other
404

Validator nodes co-operatively generate a new block utilizing the gossiped information
406

Host nodes update corresponding local copies of the blockchain appending the new block
408

FIG. 4

DATABASE ACCESS GATEWAY THROUGH DISTRIBUTED NETWORKS

TECHNICAL FIELD

This application is generally directed to access control to diverse types of databases and more specifically to a database access gateway through distributed networks.

BACKGROUND

Electronic database management has provided many benefits over manual, pen-and-paper based database management. Electronic databases may conveniently be accessed and edited through networks such as the Internet. Furthermore, operations such as database accesses, database edits, database updates, and other operations are not as cumbersome and time consuming as manual databases. Furthermore, multiple copies of electronic databases may be generated with ease.

Notwithstanding these and other benefits of electronic databases, conventionally maintained electronic databases have several technical shortcomings. For example, large organizations may have large and geographically distributed databases making access management, user tracking, and data securing very difficult. Further, organizations may have to share the databases with other organizations. While database technology has contributed greatly to facilitating data sharing, centralized database management has lagged behind in other areas. Not being able to keep up with throughput needed by larger networks and having a single point of failure are among the concerns. Managing users and data from different sources in a shared environment is also something centralized databases are not equipped to handle.

As such, a significant improvement upon electronic database management and access control is therefore desired, especially for multiple types of databases.

SUMMARY

What is therefore desired are systems and methods that provide a decentralized access gateway to multiple, diverse types of databases. What is further desired are database access systems that avoid a single point of failure. What is desired is a distributed network system that allows users to add and/or search information from various databases using parallel query schemes and distributed networks. These schemes, methods, and systems would substantially decrease the time needed to search and identify data. These schemes, methods, and systems might also secure data from being tampered with by utilizing an append-only distributed ledger.

The methods and systems described herein provide a unique combination of distributed ledger technologies. Specifically, the methods and systems described herein provide an immutable ledger of every subject vetted by the system as well as a distributed network for parallelization of search and match functions. Using a distributed network, modern hashing, and smart data indexing, the methods and systems described herein can quickly search and correlate a digital identity for an unknown identity, or simply verify one that already exists. This removes/minimizes the need of querying multiple databases and trying to get responses from various servers to find the query result and/or retrieve the requested data. The methods and systems described herein can divide the workload into various blockchains and sub-blockchains to efficiently retrieve data.

Embodiments presented herein attempt to solve the aforementioned technical problems and may provide other solutions as well. A plurality of distributed network nodes may provide a decentralized access gateway to multiple, diverse types of databases. The plurality of distributed network nodes may host a private party blockchain. To that end, each node may execute a peer-to-peer (P2P) client to perform operations associated with the private party blockchain. A subset of the nodes may be configured as validator nodes that may implement gossip protocols to cooperatively validate one or more database operations and generate a new block for the private party blockchain. Another subset of nodes may be configured as host nodes that may receive the new block and update a corresponding local copy of the private party blockchain appending the new block. Utilizing the co-operative validation of database operations and the updates appending the new blocks, the private party blockchain may maintain an immutable digital record of access and updates to the multiple and diverse types of databases.

In one embodiment, a system comprises a plurality of distributed networks, each distributed network configured to execute computer program instructions to validate one or more database operations of a plurality of secure databases interfacing at least one distributed network node, where each distributed network comprises a plurality of distributed network nodes, each network node configured to store hashed data associated with a set of users, wherein the data is stored within the plurality of secure databases; a first subset of the plurality the distributed network nodes configured to be validator nodes causing a corresponding processor to execute corresponding peer-to-peer clients to gossip with each other to co-operatively validate the one or more database operations and generate a new block; and a second subset of the plurality of distributed network nodes configured to be host nodes causing the corresponding processor to execute corresponding peer-to-peer clients update the corresponding local copies of the new block generated by the validator nodes, wherein each distributed network is connected to at least one other distributed network within the plurality of distributed networks, and wherein a hashing algorithm for each distributed network is different than other distributed networks within the plurality of distributed networks.

In another embodiment, computer-implemented method comprises receiving, from a user interacting with a computing device, an instruction to query data from at least one secure database within a plurality of secure databases; transmitting, by the computing device to a plurality of distributed networks from a set of distributed networks, the query instruction, each distributed network configured to execute computer program instructions to validate one or more database operations of the plurality of secure databases interfacing the computing device, where each distributed network comprises a plurality of distributed network nodes, each network node configured to store hashed data associated with a set of users, wherein the data is stored within the plurality of secure databases; a first subset of the plurality the distributed network nodes configured to be validator nodes causing a corresponding processor to execute corresponding peer-to-peer clients to gossip with each other to co-operatively validate the one or more database operations and generate a new block; and a second subset of the plurality of distributed network nodes configured to be host nodes causing the corresponding processor to execute corresponding peer-to-peer clients update corresponding local copies of the new block generated by the validator nodes, retrieving, by at least one network node within at least one distributed network, query result from at least one secure database; and displaying, by the computing device, the retrieved data.

It is to be understood that both the foregoing general description and the following detailed description are exemplary and explanatory and are intended to provide further explanation of the disclosed embodiment and subject matter as claimed.

BRIEF DESCRIPTION OF THE DRAWINGS

The accompanying drawings constitute a part of this specification and illustrate embodiments of the subject matter disclosed herein.

FIG. 4 illustrates a flow diagram of an illustrative method of accessing a database through a distributed access gateway, according to an embodiment.

DETAILED DESCRIPTION

Figure 1:
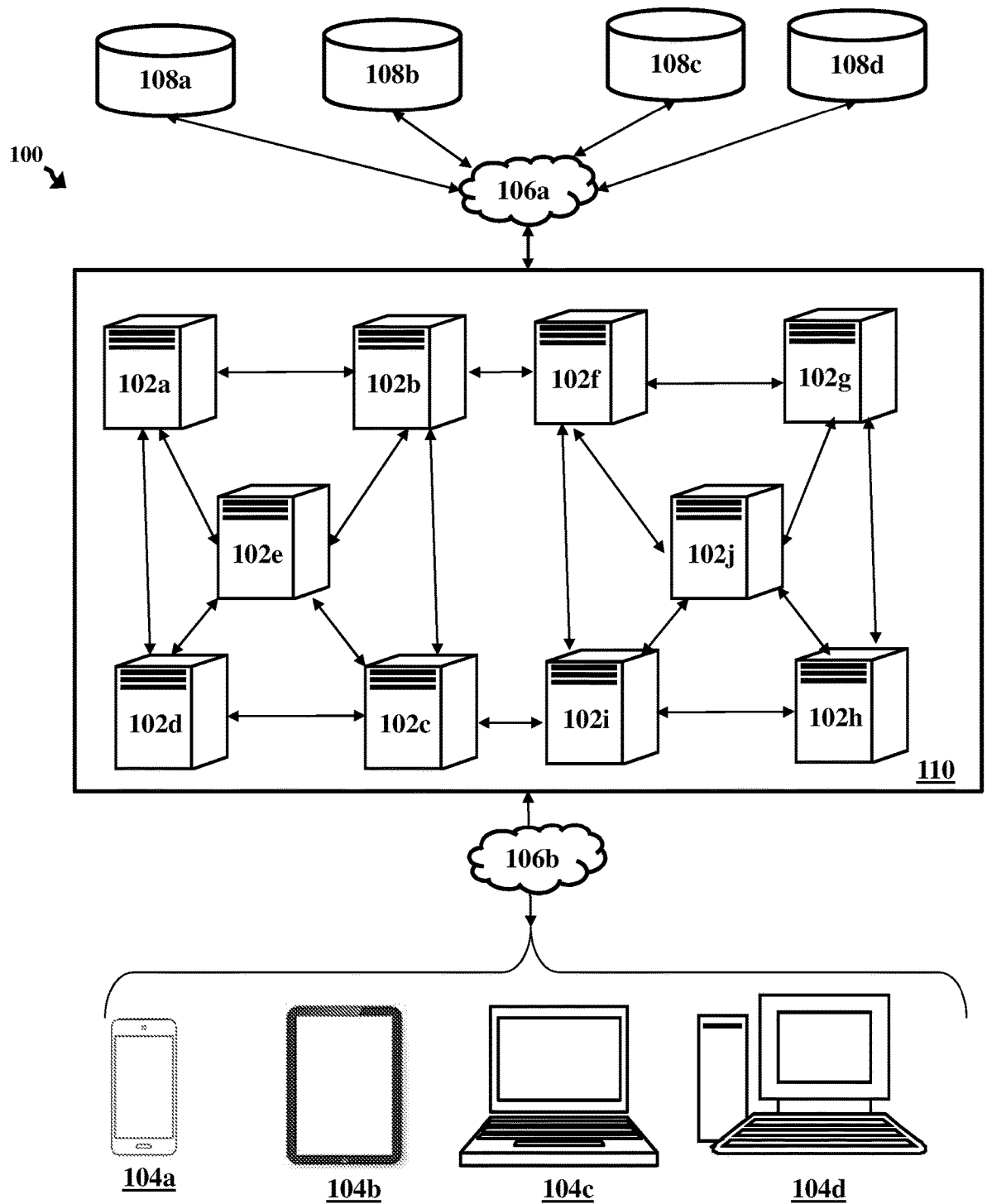
FIG. 1 illustrates a system of a distributed access gateway to a plurality of secure databases, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments disclosed herein describe systems and methods for access control of diverse types of databases utilizing a plurality of distributed network nodes. The plurality of distributed network nodes may form an access gateway to the databases. Each of the network nodes may execute a P2P client to perform blockchain operations of a private party blockchain hosted by the distributed network nodes. Unlike conventional public blockchains where every node is competitively attempting to generate a new block, the validator nodes in the private party blockchain co-operatively generate new blocks to update the private party blockchain.

The databases may be different types of databases. The databases may be associated with an organization and may store different types of information of the organization. For example, a database may store documents in any format and another database may store data records of employees of the organization. In other instances, the databases may be associated with different organizations storing diverse types of information corresponding to the different organizations. The databases may also have different levels of security, some requiring a higher level of authentication while others requiring a lower level of authentication. Furthermore, the databases may be geographically distributed and accessing the databases may require traversing through different types of networks.

The distributed network nodes may form an access gateway for the plurality of databases. As described above the distributed network nodes may host a private party blockchain that may maintain immutable records of the database operations such as accesses and updates. In particular, the private party blockchain may include records of when a database was accessed or updated, what portion of the database was accessed or updated, who accessed or updated the database, and/or any other information associated with database access and/or updates. In some instances, the private party blockchain may store the cryptographic hashes of the information and the non-hashed (e.g., plaintext) information may be stored in a non-blockchain repository. In other instances, the plaintext information may be encrypted and stored in the blockchain along with the corresponding hashes. In some other instances, the blockchain may store the hashes and the non-encrypted information. Regardless of the modality of the storage of the non-hashed information, the sequence of hashes in the private party blockchain may ensure the integrity of the document access and update data. For example, if a malicious node tampers with a block in the blockchain, the entire downstream blocks will be different and the networks node will be unable to come to a consensus on the downstream blocks of the maliciously generated block.

In an embodiment, one or more databases may store documents (e.g., biometric documents, such as fingerprint images or other biometric/authentication data) and distributed network nodes may form an access gateway for accessing, updating, and/or sharing of the documents. The private party blockchain may have immutable records of the provenance information of the documents. For example, the private party blockchain may include records of the creator of a document, the time of creation of the document, parties who accessed and/or updated the document, and/or the updates to the document. Therefore, even though the documents themselves may be stored in a central server, the provenance information of the documents is decentralized such that there may not be a single point of failure.

The distributed network nodes may also store public keys of multiple users to provide encrypted documents to the user. For example, a host P2P client may receive, validate, and store a public key associated with a first user. When the first user properly requests a document (e.g., by providing correct authentication credentials), the P2P client may encrypt the document with the public key of the first user. The user's device may in turn utilize the private key of the user to decrypt the document. In some instances, the P2P client may provide an encrypted copy of the document, e.g., the first user may download the encrypted document and use the private key for decryption. In other instances, the P2P client may stream the encrypted document such that the user may decrypt the document for viewing without necessarily being able to download the document.

To update the private party blockchain, a plurality of validator nodes may co-operatively generate a new block containing validated database operations. For example, the network may select a subset of validator nodes based upon proof of authority, which may then gossip with each other and other host nodes to validate one or more database operations and generate a new block. Therefore, as opposed to conventional proof of work protocol that consumes a large network energy as every single node is competitively trying to generate a new block, the private party blockchain may consume a lower network energy while providing a distributed access gateway.

A gossip between the different network nodes as used herein refers to information transfer by the nodes such that the network is saturated with the information being transferred. A network saturation refers to a threshold number of nodes (e.g., depending upon the consensus protocol) receiving the information. Network saturation may also be referred to as a network convergence. The network nodes may use one or more protocols to gossip information to each other. In an illustrative protocol, a network node may maintain a list of other network nodes with active communication links with the network node, e.g., based upon a past successful acknowledgment of a sent message. The list of other network nodes may also be referred to as neighbor nodes for the network node. For gossiping, the network node may transmit a piece of information (e.g., a record of a database edit) to every neighbor node. Similarly, if a neighbor node has received the information from another node, the neighbor node may transmit the information to the network node. It should generally be understood that gossiping refers to each network node co-operatively and non-competitively (e.g., by not withholding information) sharing information with its neighbor nodes.

Throughout this document, various aspects of the methods and systems described herein are explained in the context of (public or private) blockchain. However, it is expressly understood that the methods and systems described herein are applicable to any distributed network, such as decentralized structured/unstructured distributed networks.

FIG. 1 shows an illustrative system 100 for providing an access gateway to multiple and diverse types of databases, according to an embodiment. As shown, the system 100 may comprise distributed network nodes 102a-102j (collectively or commonly referred to as 102) forming an access gateway 110, client devices 104a-104d (collectively or commonly referred to as 104), networks 106a, 106b (collectively or commonly referred to as 106), and databases 108a-108d (collectively or commonly referred to as 108). It should be understood that the system 100 and the aforementioned components are illustrative and should not be considered limiting. Systems with additional, alternative, or lower number of components should be considered within the scope of this disclosure.

The distributed network nodes 102 may include any kind of computing devices that may host a private party blockchain. At minimum, a network node 102 may comprise a non-transitory storage medium (e.g., hard disk drive, random access memory) and a processor electrically coupled to the non-transitory storage medium. In addition to an operating system and/or other applications, the non-transitory storage medium may store a plurality of computer program instructions forming a P2P client software. The processor may execute the P2P client software to implement the blockchain functions described throughout this disclosure. Non-limiting examples of the network node 102 include a server computer, a desktop computer, a laptop computer, a tablet computer, and a smartphone.

A network node 102 may be configured as a host node. A processor executing the P2P client at the host node may append a validated block to a local copy of the blockchain. The host node may receive the validated block from another host node or from a validator node. The validated block may include records of one or more database operations. As shown in FIG. 1, network nodes 102a-102d, 102f-102i may be configured as host nodes.

A network node 102 may be considered as a validator node. A processor executing the P2P client at the validator node may validate one or more database operations and co-operatively generate a new block for the blockchain hosted by the distributed network nodes 102. To co-operatively generate the new block, the P2P client may execute one or more gossip protocols to communicate with one or more other validator nodes. After the validator node has generated the new block, the validator node may transmit the new block to other host nodes for the host nodes to append the new block to the corresponding blockchains. As shown in FIG. 1, network nodes 102e, 102j may be configured as validator nodes.

The client computing devices 104 may include kind of computing device such as a desktop computer 104d, a laptop computer 104c, a tablet computer 104b, a smartphone 104a, and/or any other type of computing device. The client computing devices 104 may include an electronic storage storing computer program instructions and at least one processor that may execute the computer program instruction. The client computing device 104 may also include a memory to store the computer program instructions during execution and store the results of the execution. The client computing devices 104 may communicate with the access gateway 110 through the network 106b.

The databases 108 may include any kind of electronic databases. The databases 108 may be hosted by any kind of database hardware environment such as database servers. The databases 108 may be diverse types of database. A first database 108a may be a relational database while a second database 108b may be a non-relational database. Another database 108c may be maintained by an organization and another database 108d is maintained by another organization. These databases 108a, 108b may have different access and update rules. The databases 108 may further store different types of data, e.g., data records with different types of data fields. The databases 108 may also have different levels of security thereby requiring different types of authentication. It should be understood that these are but a few illustrative examples of different types of databases and should not be considered limiting, any kind of databases 108 with differing attributes should be considered within the scope of this disclosure. The access gateway 110 may access the databases 108 through the network 106b.

The networks 106 may include any form of communication medium between the components of the system 100. Examples of the network 106 include, but are not limited to, Local Area Network (LAN), Wireless Local Area Network (WLAN), Metropolitan Area Network (MAN), Wide Area Network (WAN), and the Internet. The communication over the network 106 may be performed in accordance with various communication protocols, such as Transmission Control Protocol and Internet Protocol (TCP/IP), User Datagram Protocol (UDP), and IEEE communication protocols. It, should be understood that the networks 106 might include both packet switching and circuit switching (e.g., telephony) components. It should further be understood that the networks 106a, 106b are shown and described are merely illustrative and should not be considered limiting. There may be multiple networks or single network to facilitate communications between the different components of the system 100.

In an illustrative operation, a client computing device 104 may request a database update to a database 108 through the access gateway 110. More specifically, the client computing device 104 may generate a database update request and provide the request to a network node 102 in the access gateway 110. The network node may query the private party blockchain to retrieve one or more, blocks associated with the database 108. When the network node 102 determines that, the update request is valid based on the blockchain query, the update request may be validated and transferred to the corresponding database 108. Furthermore, the network node 102 may use the validators to update the private party blockchain with the update request and any updates associated with the update request.

Figure 2:
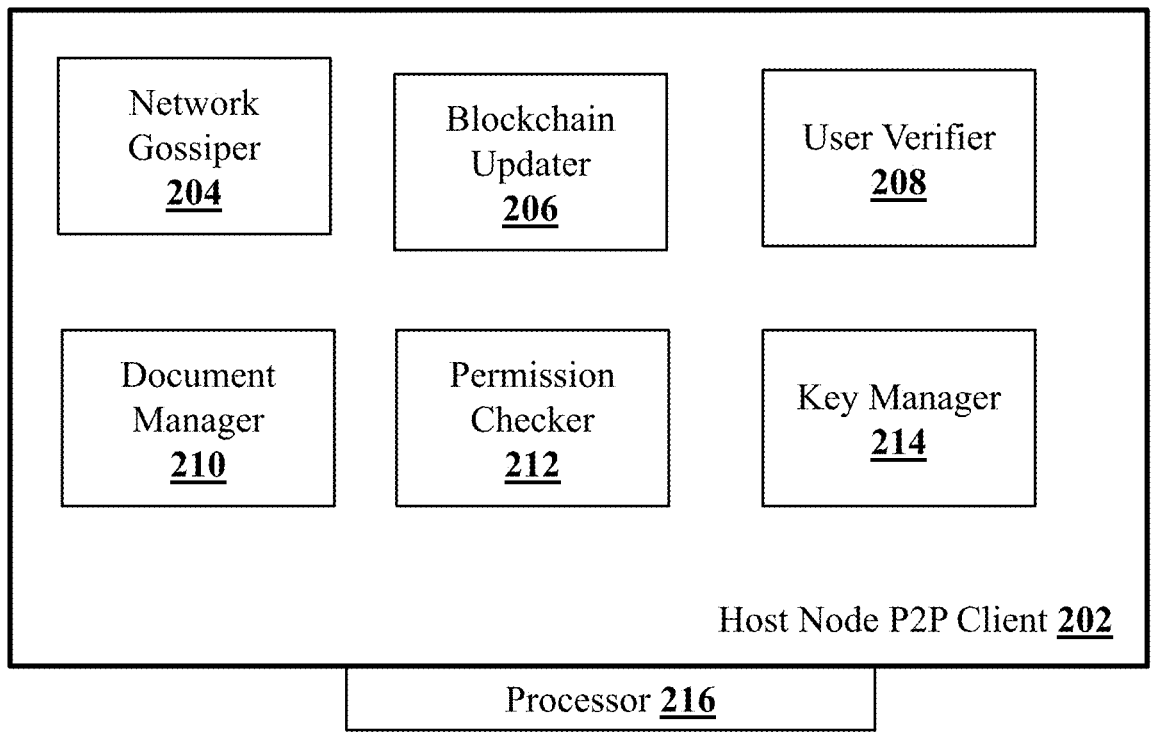
FIG. 2 illustrates software modules of a host P2P client, according to an embodiment.

FIG. 2 shows illustrative software modules 200 of a host node P2P client 202, according to an embodiment. As shown, the software modules may include a network gossiper 204, a blockchain updater 206, a user verifier 208, a document manager 210, a permission checker 212, and a key manager 214. It should be understood that the software modules 200 as shown in FIG. 2 and described herein are merely illustrative and additional, alternative, or fewer number of software modules should be considered to be within the scope of this disclosure. The software modules 200 may be stored as a plurality of computer program instructions in a non-transitory storage medium on the host node. The software modules 200 may be executed by a processor 216 electrically coupled to the non-transitory storage medium.

The network gossiper 204 may implement one or more gossip protocols to communicate with other nodes (e.g., host nodes, validator nodes). For example, the network gossiper 204 along with the network gossipers of the other nodes may enable a saturation of information within a plurality of distributed nodes. More specifically, the network node gossiper 204 may receive data records indicating access and/or updates to one or more databases, store the received information, and transmit the received information to other nodes. To that end, the network gossiper 204 may maintain a list of other nodes with working communication links with the host node client 202. The network gossiper 204 may periodically update the list to accommodate for the changing parameters of the network. The network gossiper 204 may also receive a validated block and provide the validated block to the blockchain updater 206.

The blockchain updater 206 may maintain and update a local copy of the private party blockchain. For instance, the blockchain updater 206 may receive a new block containing validated database operations and append the new block to the local copy of the blockchain. In some instances, the blockchain updater 206 may receive the new node from another host node through a gossip protocol implemented by the network gossiper 204. In other instances, the blockchain updater 206 may receive the new node from a validator node. The blockchain updater 206 may further gossip with other nodes to download the latest valid blockchain. It should be understood that these are merely illustrative operations performed by the blockchain updater 206 and other operations for maintaining and updating the private party blockchain should be considered within the scope of this disclosure.

The user verifier 208 may authenticate or other verify an identity of user attempting to access a database through an access gateway enabled by the plurality of network nodes. To that end, the user verifier 208 may prompt authentication credentials from a user and compare received authentication credentials with corresponding user credentials stored on the access gateway. The user verifier 208 may also perform a multi-factor authentication prompting the user to provide different pieces of verifiable information through different communication channels. It should be understood that the user verification performed by the user verifier 208 may in addition to or as an alternative to the authentication protocol executed by a database that the user is attempting to access through the access gateway.

The document manager 210 may manage access, download, and/or update control of documents downloaded from the databases using the access gateway. Depending upon the security level and permissions framework of a corresponding database, the document manager 210 may directly download a document and provide a document to a client device. In other instances, the document manager 210 may store the downloaded document locally and allow access to the document to the client device. In some embodiments, the document manager 210 may not directly download the document, but produce access information (e.g., document address within the corresponding database and access credentials to the document) and provide the access information to the client device. The document manager 210 may track the usage of the document, associated metadata, and upload the tracking information to the blockchain. In other words, the private party blockchain may have an immutable audit log of each document downloaded from the one or more databases.

The permission checker 212 may compare a user's permission with document permission and determine whether a requested document should be provided to the user. The user may be, for example, associated with a particular level of permission. The levels of permissions may be hierarchical, users with more authority within the system may have a hierarchically higher permission level and users with less authority within the system may have a lower permission level. Similarly, more secure documents may have to be restricted and therefore be associated with a higher level of permission and less secure documents may not require a higher level of restriction and therefore may be associated with lower level of permission. Therefore, for every document access request, the permission checker 212 may verify that the permission level of the requesting user matches the permission level of the document. If there is a match, the permission checker 212 may cause the document manger 210 to provide an access to the document. If there is no match and the permission level of the requesting user is lower than the permission level of the document, the permission checker 212 may request the document manager not to provide access to the requested document to the requested user.

The key manger 214 may manage cryptographic keys associated with different users. For example, the key manager 214 may receive and store a user's public key. When the user requests a document or any other downloadable material, the key manager 215 may encrypt the document with the user's public key and provide the encrypted document to the user. In other instances, key manager may provide the user's public key to the database or the document manager to encrypt and stream a document to the user such that the user may decrypt the streamed encrypted document using the user's private key. In addition to receiving and storing the public key of the user, the key manager 214 may verify the public key of the user through, for example, public key infrastructure.

Figure 3:
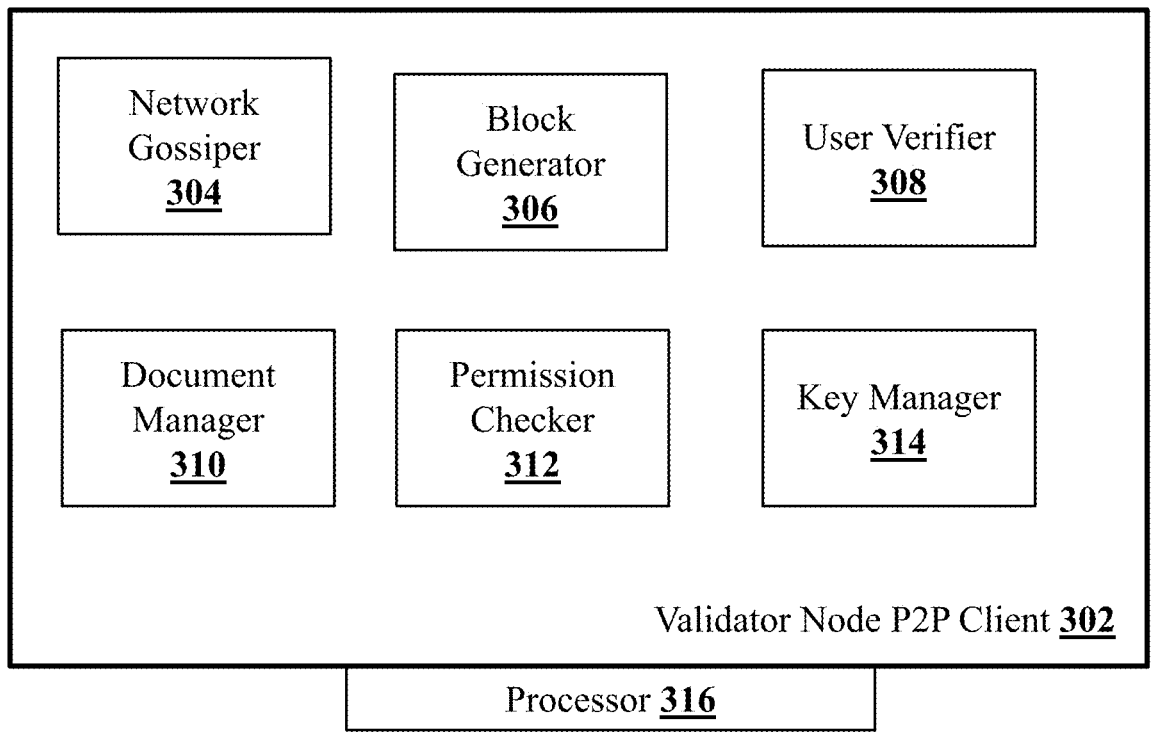
FIG. 3 illustrates software modules of a validator P2P client, according to an embodiment.

FIG. 3 shows illustrative software modules 300 of a validator node P2P client 302, according to an embodiment. As shown, the software modules 300 may include a network gossiper 304, a block validator 306, a user verifier 308, a document manager 310, a permission checker 312, and a key manager 314. It should be understood that the software modules 300 as shown in FIG. 3 and described herein are merely illustrative and additional alternative, or fewer number of software modules should be considered to be within the scope of this disclosure. The software modules 300 may be stored as a plurality of computer program instructions in a non-transitory storage medium on the host node. The software modules 300 may be executed by a processor 316 electrically coupled to the non-transitory storage medium.

The network gossiper 304 may implement one or more gossip protocols to communicate with other nodes (e.g., host nodes, validator nodes). For example, the network gossiper 304 along with the network gossipers of the other nodes may enable a saturation of information within a plurality of distributed nodes. More specifically, the network node gossiper 304 may receive data records indicating access and/or updates to one or more databases, store the received information, and transmit the received information to other nodes. To that end, the network gossiper 304 may maintain a list of other nodes with working communication links with the validator node P2P client 302. The network gossiper 304 may periodically update the list to accommodate for the changing parameters of the network. As the network gossiper 304 is within the validator P2P client 302, the network gossiper 304 may communicate with other validator nodes to validate one or more database operations (e.g., document access/update) and generate a new block. The network gossiper 304 may further provide a newly generated block to other host nodes for the host nodes to update their respective copies of the blockchain.

The block generator 306 may generate a new block for the private party blockchain. The new block may include one or more validated database operations. The block generator 306 may invoke the network gossiper 304 to cooperatively generate the new block. In some instances, the new block may include records of the one or more validated database operations and a cryptographic hash of a combination of content of the new block and the contents of one or more previous blocks. In some instances, the new block may just include the cryptographic hash without the data records. In other instances, the new block may include a cryptographic hash and the content encrypted with one or more keys.

The user verifier 308 may authenticate or other verify an identity of user attempting to access a database through an access gateway enabled by the plurality of network nodes. To that end, the user verifier 308 may prompt authentication credentials from a user and compare received authentication credentials with corresponding user credentials stored on the access gateway. The user verifier 308 may also perform a multi-factor authentication prompting the user to provide different pieces of verifiable information through different communication channels. It should be understood that the user verification performed by the user verifier 308 may in addition to or as an alternative to the authentication protocol executed by a database that the user is attempting to access through the access gateway.

The document manager 310 may manage access, download, and/or update control of documents downloaded from the databases using the access gateway. Depending upon the security level and permissions framework of a corresponding database, the document manager 310 may directly download a document and provide a document to a client device. In other instances, the document manager 310 may store the downloaded document locally and allow access to the document to the client device. In some embodiments, the document manager 210 may not directly download the document, but produce access information (e.g., document address within the corresponding database and access credentials to the document) and provide the access information to the client device. The document manager 310 may track the usage of the document and associated metadata and upload the tracking information to the blockchain. In other words, the private party blockchain may have an immutable audit log of each document downloaded from the one or more databases.

The permission checker 312 may compare a user's permission with document permission and determine whether a requested document should be provided to the user. The user may be, for example, associated with a particular level of permission. The levels of permissions may be hierarchical, users with more authority within the system may have a hierarchically higher permission level and users with less authority within the system may have a lower permission level. Similarly, more secure documents may have to be restricted and therefore be associated with a higher level of permission and less secure documents may not require a higher level of restriction and therefore may be associated with lower level of permission. Therefore, for every document access request, the permission checker 312 may verify that the permission level of the requesting user matches the permission level of the document. If there is a match, the permission checker 312 may cause the document manger 310 to provide an access to the document. If there is no match and the permission level of the requesting user is lower than the permission level of the document, the permission checker 312 may request the document manager not to provide access to the requested document to the requested user.

The key manger 314 may manage cryptographic keys associated with different users. For example, the key manager 214 may receive and store a user's public key. When the user requests a document or any other downloadable material, the key manager 215 may encrypt the document with the user's public key and provide the encrypted document to the user. In other instances, key manager may provide the user's public key to the database or the document manager to encrypt and stream a document to the user such that the user may decrypt the streamed encrypted document using the user's private key. In addition to receiving and storing the public key of the user, the key manager 314 may verify the public key of the user through, for example, public key infrastructure.

FIG. 4 shows a flow diagram of an illustrative method 400 of secure database access through a distributed access gateway, according to an embodiment. The steps of the method shown in FIG. 4 and described herein are merely illustrative and should not be considering limiting. Other methods with additional, alternative, or a fewer number of steps should be considered within the scope of this disclosure.

The method 400 may start at step 402, where a network node may perform a database operation associated with a secure database. The network node may be within a plurality of distributed network nodes hosting a private party blockchain. The distributed network nodes may interface a plurality of secure databases and operate as an access gateway to the plurality of secure databases. The private party blockchain may maintain immutable records of the database operations associated with the plurality of secure databases. An illustrative database operation is document access from the secure database.

At a next step 404, validator nodes of the distributed network nodes gossip information associated with the database operation with each other. For example, a subset of the distributed network nodes may be selected to validate the database operation and the selected nodes may transmit and receive information associated with the database operation from each other such that each of the validator nodes have the information. In other words, the gossiping among the validator nodes may saturate the validator network nodes with the information associated with the database operation.

At a next step 406, the validator nodes generate a new block utilizing the gossiped information. More specifically, at least one of the validator nodes may include the information in the new block and generate a hash of the information combined with the content from at least one of the previous blocks. The hash of the content of the previous block cryptographically links the new block with the previous blocks of the blockchain.

At a next step 408, the host nodes update corresponding local copies of the blockchain by appending the new block. More specifically, the validator nodes may gossip the new block to the host nodes. Upon receiving the new block, the host nodes may append the new node to the corresponding local copies of the blockchain, thereby creating an immutable record of the database operation within the plurality of distributed network nodes.

Figure 5:
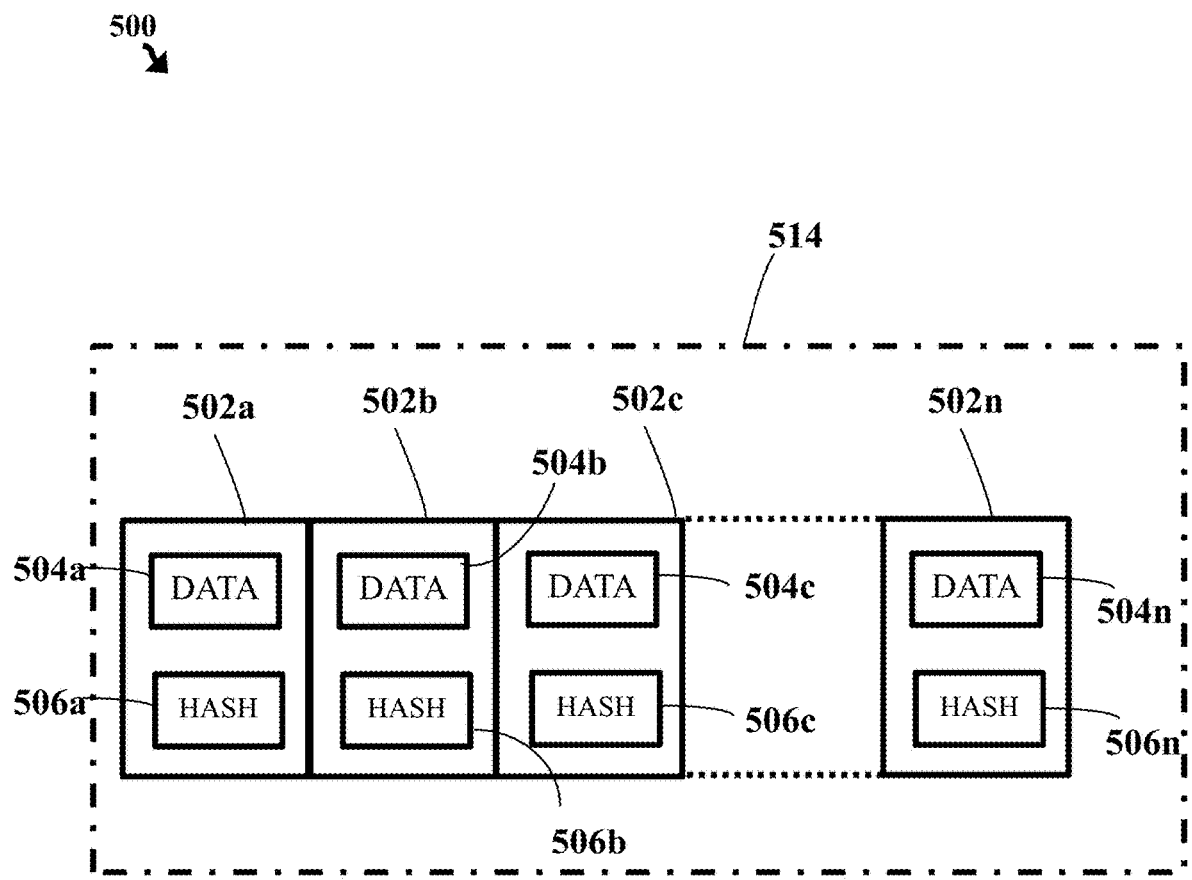
FIG. 5 illustrates a non-limiting example of a distributed network, according to an embodiment.

Referring now to FIG. 5, a non-limiting example of a distributed network is illustrated, according to an embodiment. As depicted in FIG. 5, the blockchain 514 comprises block instances 502*a*-502*n* (collectively 502) may include data 504*a*-504*n* (collectively 504), such as biometric identification data (e.g., machine-readable code/documents, and metadata associated with different users). Also contained in the blockchain instances are hash values 506*a*-506*n* (collectively 506) that are used to link each of the block instances to the preceding blockchain instances or blockchain formed by the preceding blockchain instances, as understood in the art.

The methods and systems described herein can be implemented on a blockchain illustrated in FIG. 5. Blockchains gather data into blocks that are then hashed and linked to the next block. This method/computer system creates chained blocks of data that are immutable. The chaining of hashes together ensures that even a small change would have a cascading effect on the chain, breaking the hashes and becoming evident that someone (e.g., a node within the blockchain and/or a third party) has tampered with the data.

As explained above, a central server (or one or more nodes within the distributed nodal systems described herein) may generate (or instruct a blockchain service to generate) the block instance 502*a*. The server/node may receive data 504*a* from a first computing device (e.g., first node or a first data repository). For example, an administrator using the first computing device/node may log in a website hosted or otherwise associated/managed by the blockchain 514 and transmit data 504*a* to be stored within the blockchain 514. Upon generation of block instance 502*a*, the server/node may generate hash value 506*a* based on the data 504*a*, the first node (e.g., the first computing device), identifier information (e.g., time stamp and/or geolocation), and/or an identification of the user. A skilled artisan will recognize that various data/information associated with the inputted data (or sometimes random data) may be used to generate the hash value 506*a*.

In some embodiments, the node may execute a hashing algorithm to generate the hash 506*a*. The hashing algorithm may be selected at random or based on various attributes associated with the data. For instance, the hashing algorithm may correspond to a user associated with the data when the data is related to biometric data of a user. In some configurations, the hashing algorithms may correspond to an attribute of the user (e.g., nationality of the user). In some configurations, the hashing algorithm may correspond to the node uploading the data. For instance, the hash algorithm may reflect whether the node uploading the data (or generating the block instance) belongs to a certain division of a company/entity or a certain department. When multiple distributed nodes (e.g., blockchains) are interconnected, a node may utilize different hashing algorithms to identify different distributed nodes (e.g., blockchains and sub-blockchains).

The data, as used herein, may refer to the actual files stored onto a data repository of a node within the distributed network (e.g., blockchain). For instance, the data 504*a* may refer to biometric data of a user (e.g., fingerprint image of a user) that is stored onto a computing device represented by the block instance 502*a*. In some configurations, the data may refer to a hashed/encrypted version of the data stored onto each node. For instance, data may refer to the data generated a result of execution of a hashing algorithm on the fingerprint image of the user.

The server/node may also generate (or instruct a blockchain service to generate) the block instance 502*b*. The server/node may receive data 504*b* from a second computing device (e.g., second network node). For example, an administrator using the second computing device may log in a website hosted or otherwise managed by the server (or one or mode nodes associated with the blockchain 514) and transmit data 504*b* to be stored within the blockchain 514. The server/node may also generate hash value 506*b* based on the data 504*b*, the second network node (e.g., identifier information such as time stamp, geolocation, and/or a computing device identifier), and the like.

The hash value 506*b* may also include information regarding the hash value 506*a*. The server/node may incorporate the hash value 506*a* into the hash value 506*b* in order to append the block instance 502*b* to the block instance 502*a*. The server/node may subsequently poll all the nodes in order to ensure the highest integrity of the blockchain by appending the latest block instance to the latest valid blockchain instances. The polling/validating may be performed using conventional validation methods or using the methods described in FIGS. 1-4. Using this method blockchain instances within the block chain 514 may be appended to the preceding blockchain instance. The server/node may generate block chain instance 502*c-n* using the same methods explained above in order to continuously update blockchain 514. As depicted, block instances 502*a*, 502*b*, 502*c*, and 502*n* are connected because of synchronization of hash values 506*a*, 506*b*, 506*c*, and 506*n*.

In some configurations, additional information, such as an identifier associated with network nodes adding or updating the data could also be included within the blockchain or incorporated within the hash value. As an example, if a network node modifies or adds any data to the blockchain, an identifier associated with the computing device who contributed to creating or modifying the data may be included in the respective block. In some embodiments, the identifier may include a time stamp (e.g., data regarding the time of data modification or creation) and/or a geolocation (e.g., data regarding the location within which the data modification or creation has occurred or has a value based on the user's geo-location). The identifier may also be incorporated within the hash value and may be used by the analytics server as a part of the hashing algorithm. Such identification information may be used as a veracity scale factor that the information is true and accurate.

The server/node may also transmit the blockchain instances to all the network nodes within the blockchain in order to preserve the integrity of the blockchain. For example, the server/node may transmit the hash value 506c (e.g., the hash value generated for block instance 502c based on data 504c received from a third node) to the first node (e.g., the first computing device storing the block instance 502a) and the second node (e.g., the second computing device storing the block instance 502b).

Even though FIG. 5 illustrates implementation of the methods and systems described herein on a blockchain, it is expressly understood that the methods and systems described herein can be implemented on any distributed ledger technology. For instance, in some configurations, the methods and systems described herein can be implemented on directed acyclic graph (DAG). While a conventional blockchain may be a long chain of data linked together, a DAG may be more dynamic and can be built in multiple directions. This may allow for better control over the data. As will be described below, with respect to the interconnected distributed networks illustrated in FIG. 6, DAG may combine multiple distributed nodes to increase operational efficiencies.

When implemented on a DAG, instead of all the data being aggregated into conventional data blocks, the data will be allocated into different distributed networks. The DAG may include multiple distributed networks that can "grow" in multiple directions depending on the data being appended. The DAG can be viewed as being several blockchains (or any other distributed network) woven together. Therefore, data can be separated based on the person, location or organization, or any other pre-determined method used to structure the DAG and/or retrieve the data. Having multiple interconnected blockchains may have several advantages. For instance, searching this type of data structure may be easier because instead of searching the entire blockchain, a node can narrow the query based on various attributes. Grouping and structuring the data may be easier than generating a single blockchain. As a result, searching the pre-arranged, pre-structured, and pre-grouped data may also require less computing resources and would result in less search time.

Figure 6:
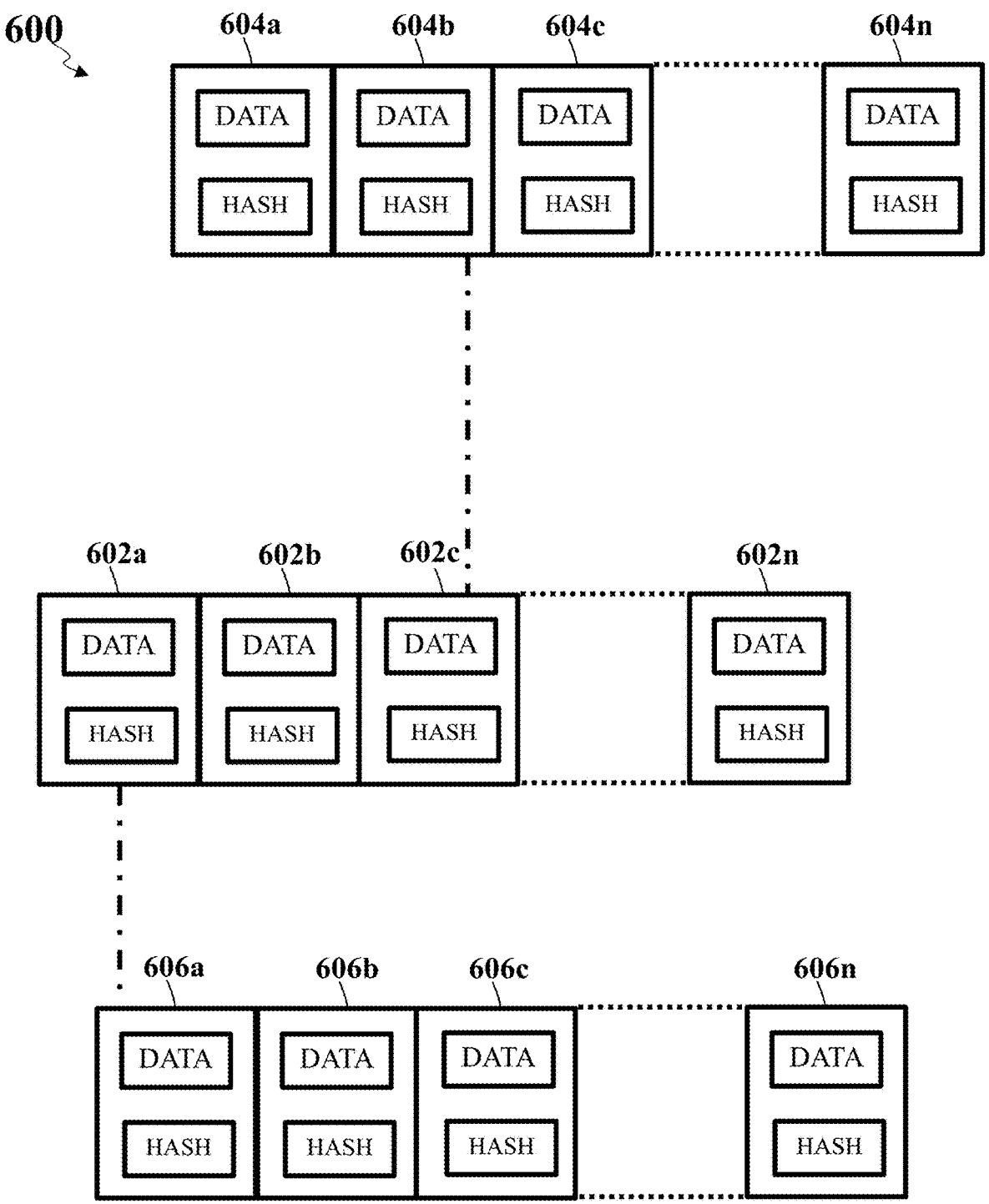
FIG. 6 illustrates a non-limiting example of interconnected distributed networks, according to an embodiment.

Referring now to FIG. 6, a non-limiting example of a distributed ledger having multiple sub-ledgers is illustrated. In the non-limiting example 600 the blockchain 602 includes sub-blockchains 604 and 606. As depicted in FIG. 6, the blockchain 602 comprises block instances 602a-602n. Each block instance may include data and/or hash values. In some embodiments, each block instance may only include a hash value or a computer executable code identifying where the data is stored. Therefore, the data stored onto each block instance may enable information, such as biometric data, machine-readable code/documents, and other metadata associated with different users.

Using the hashing methods (e.g., algorithms) described above, a server and/or a node within the blockchain 602 may append the blockchain 604 and 606 to the blockchain 602. For instance, network node associated with the block instance 602c may generate a hash value that appends the blockchain 604 to the blockchain 602.

In some configurations, the blockchain and different sub-blockchains may have a hierarchical relationship. In some configurations, the blockchain 606 and/or 604 may not be accessible to one or more nodes within the blockchain 602. For instance, the network node associated with the block instance 604a may not have access to the data stored within (or otherwise associated with) the blockchain 602 and/or 606. However, every network node within the blockchain 602 may have access to data stored within (and otherwise associated with) sub-blockchains 604 and/or 606.

Each blockchain and/or sub-blockchain may include various unique attributes. For instance, the blockchain 602 may differ from sub-blockchains 604 and 606 in one or more attributes. For instance, the hashing algorithm used for the blockchain 602 may be different from the hashing algorithm used for the sub-blockchains 604 and/or 606. Furthermore, each blockchains and/or sub-blockchain may include one or more validator nodes and host nodes.

In some configurations, each sub-blockchain 604 and/or 606 may correspond to a separate entity to increase operational efficiency. For instance, instead of storing all the data within the blockchain 602, the data storage may be allocated to sub-blockchain 604 and 606. For instance, the blockchain 602, and sub-blockchains 604 and 606 may belong to different departments or different divisions within an entity or a company. When a node within each blockchain and/or sub-blockchain queries for information, the node may first query within its own blockchain/sub-blockchain. The node may then query other related blockchains.

In a non-limiting example, a computing device associated with block instance 604a may query data. The computing device may then utilize the methods and systems described herein to retrieve data from the blockchain 604 (e.g., identify an address of the data stored within a database associated with the blockchain 604). The methods and systems described herein can also be implemented onto the blockchain 602 and the sub-blockchain 606 in a parallel manner to increase efficiency. For instance, while the data is being retrieved in the sub-blockchain 604, data can also be retrieved from the blockchain 602 and the sub-blockchain 606 in a parallel manner. In this way, multiple blockchains (distributed networks) may be searched without requiring additional computing resources and/or additional search time. The implementation of parallel blockchains increases efficiency and search time without sacrificing data integrity.

The methods and systems described herein can be implemented on various configurations of distributed networks. For instance, these methods and systems can be implemented on completely de-centralized networks where each node is equal. These methods and systems can also be implemented on structured decentralized networks where nodes are split into categories, such as master/slave nodes or host/validator nodes. As described herein, different blockchains and sub-blockchains (interconnected distributed networks) may be divided based on various pre-determined attributes. When querying data, instead of querying one aggregated blockchain, a node may only send query instructions to a selected group of sub-blockchains, thereby increasing efficiency and reducing time and computing resources needed.

The interconnected distributed data structures illustrated in FIG. 6 may also include various other data structures to increase querying efficiency. This may include hash lookup tables and other indexing information to allow for different types of searches and quick responses. Network nodes may use these data tables to identify and query specific distributed networks.

Each distributed network shown in FIGS. 5-6 may be a structured or an unstructured distributed network. A structured decentralized distributed network refers to a distributed network having some nodes on the network that have more authority over others. When generating (or updating) structured decentralized networks, a node can designate master nodes that will be managing the network and slave nodes that will simply hold a copy of the ledger and perform network operations as delegated by the master nodes. Different structures and configurations of a structured decentralized network are described in FIGS. 1-4. A structured decentralized network may provide ways to distribute workloads on the network, and may allow more control over congestion and the distribution of the network. In a structured decentralized network, one (e.g., a node) can also delegate and allocate work between master/slave nodes to increase efficiency and scalability.

For a structured decentralized network, it may be desirable to implement a practical byzantine fault tolerant (PBFT) algorithm to reach network consensus. PBFT may provide certain master nodes control over validation of data added to the network. Nodes would then request validation from the validators, and if enough nodes agree on the state of the ledger and verify the data, the data will be added to the ledger. This consensus methodology may be an ideal implementation given that the methods and systems described herein may be implemented on private permissioned distributed ledgers.

Another consensus option may correspond to a completely decentralized network, where every node on the network is essentially equal and each node carries a copy of the distributed ledger. Each node would communicate on the peer-to-peer network and would authenticate with each other. This distribution may be more suitable for anonymous networks that require no user to be of higher authority than another. This consensus method may also make the network difficult to attack, but does have a vulnerability to a "51% attack", which requires control over 51% of the nodes on the network to effect change. This type of network may use a proof of work or proof of stake algorithm for consensus.

Proof of work is a consensus algorithm and requires computer hardware (e.g., graphics cards) to implement. Proof of work may require overhead and computing resources. However, proof of work may be desired because it can be easily tested and compared to other algorithms. Additionally or alternatively, proof of stake (or its variation referred to as poof of authority) may designate nodes chosen to validate data, which have either the authority or something valuable at stake to perform validation on the network. This consensus method may provide certain nodes on the network more authority than other methods may. Simply put, this method prefers some nodes to analyze/verify data and decide what information is included/appended to the ledger.

The methods and systems described herein can be implemented using any of the above-described distributed network configurations and/or consensus methods. In some embodiments, a combination of the above-described distributed network configurations and/or consensus methods may be used. For instance, when having multiple interconnected blockchains, one or more blockchains may utilize a first consensus method and may be generated based on a structured network configuration while another blockchain may be decentralized and may use a different consensus method.

Storage of the data can be achieved in at least three different methods. Therefore, the bulk of the data may not always be stored within the distributed networks. In one implementation, the data may be stored as a part of the ledger. In another implementation, the data may be stored in one or more databases (some existing), which are connected to the distributed networks. Therefore, the methods and systems describe herein can be implemented retroactively onto existing databases. As a result, an existing computer system may be retrofitted, such that the methods and systems described herein are implemented with minimal interference with the existing computer system. For instance, an existing computer system having databases configured to store data can be reconfigured (with minimal interference), such that the access and/or control of the data is permitted using the distributed networks described herein.

In a first configuration, using existing databases and just controlling access to them may not require migration of data. This method may be easy to integrate and certify with existing systems because data stored within databases in working order will not need to be migrated. In this configuration, existing databases are connected to one or more distributed networks. Therefore, all requests to access (e.g., query, modify, or delete) data may only be transmitted to the databases via the distributed networks. If a valid request for information is transmitted through the distributed network, one or more nodes can query the existing databases, retrieve data, and display/transmit the retrieved data. This method provides minimal interference to existing databases/computing systems.

In a second configuration, the methods and systems described herein may include all possible data on the distributed ledger. In this configuration, various nodes may condense data and store the data as part of the data structure (e.g., distributed networks). This implementation may require indexing and condensing of the data with hashing and strong encryption to keep data in the ledger safe.

A third configuration may be implementing a new distributed database, which is spread out amongst the nodes (e.g., store part of the data onto different nodes). This method distributes the network traffic and provides more control over the data. However, this method may also require data migration from the existing databases to the nodes within the distributed network.

Querying Data:

In configurations implemented on a completely decentralized distributed network, searching data may primarily be based on hashing signatures of the data. For instance, when a node receives data and an instruction to identify corresponding existing data, the node may hash the received data and then compare the hashed data to hashes of existing data. In a non-limiting example, if a node receives biometric data associated with a user, the node may first hash the biometric data (based on hashing algorithms identified in the hashing tables). The node may then compare the hashed data to existing hashes within one or more distributed networks and/or databases.

In configurations where DAG is used, the data storage may be different. For instance, DAG may provide different options when searching for data points. Because a DAG is not one aggregated chain of data blocks, it can be divided into smaller search sizes, based on user or geolocation (or any other predetermined attribute). Each chain that is a part of the DAG can represent a separate segmentation of data. Therefore, a node can first identify attributes of the data to be queried and then identify one or more distributed networks to be queried.

For instance, one distributed network can correspond to data for unknown users (e.g., unregistered users). Another distributed network can correspond to enrolled users (e.g., known and registered users). A third distributed network can correspond to data associated with American users. Therefore, when searching for biometric data of an American user who has previously enrolled, a node can limit the query to the first and third distributed networks to increase efficiency. The node can hash the biometric information of the person purporting to be an enrolled user and transmit an instruction to the first and third distributed networks to identify whether the hashed data matches any existing data. The node can transmit the instructions in parallel to increase efficiency.

In structured distributed networks where nodes are classified as master nodes and slave nodes, parallelization-searching schemes can be utilized to increase searching efficiency. For instance, master/validator nodes can divide jobs (e.g., queries) into smaller tasks and delegate them to nodes underneath them, reducing the search space and network congestion. This method also reduces the likelihood of overlapping search spaces done by a completely decentralized network.

In some configurations, where databases are connected to the distributed networks and the data is stored onto the databases, queries can be segmented in order to increase efficiencies. For instance, various nodes (belonging to the same or different distributed networks) can query more than one databases simultaneously to achieve results.

Figure 7:
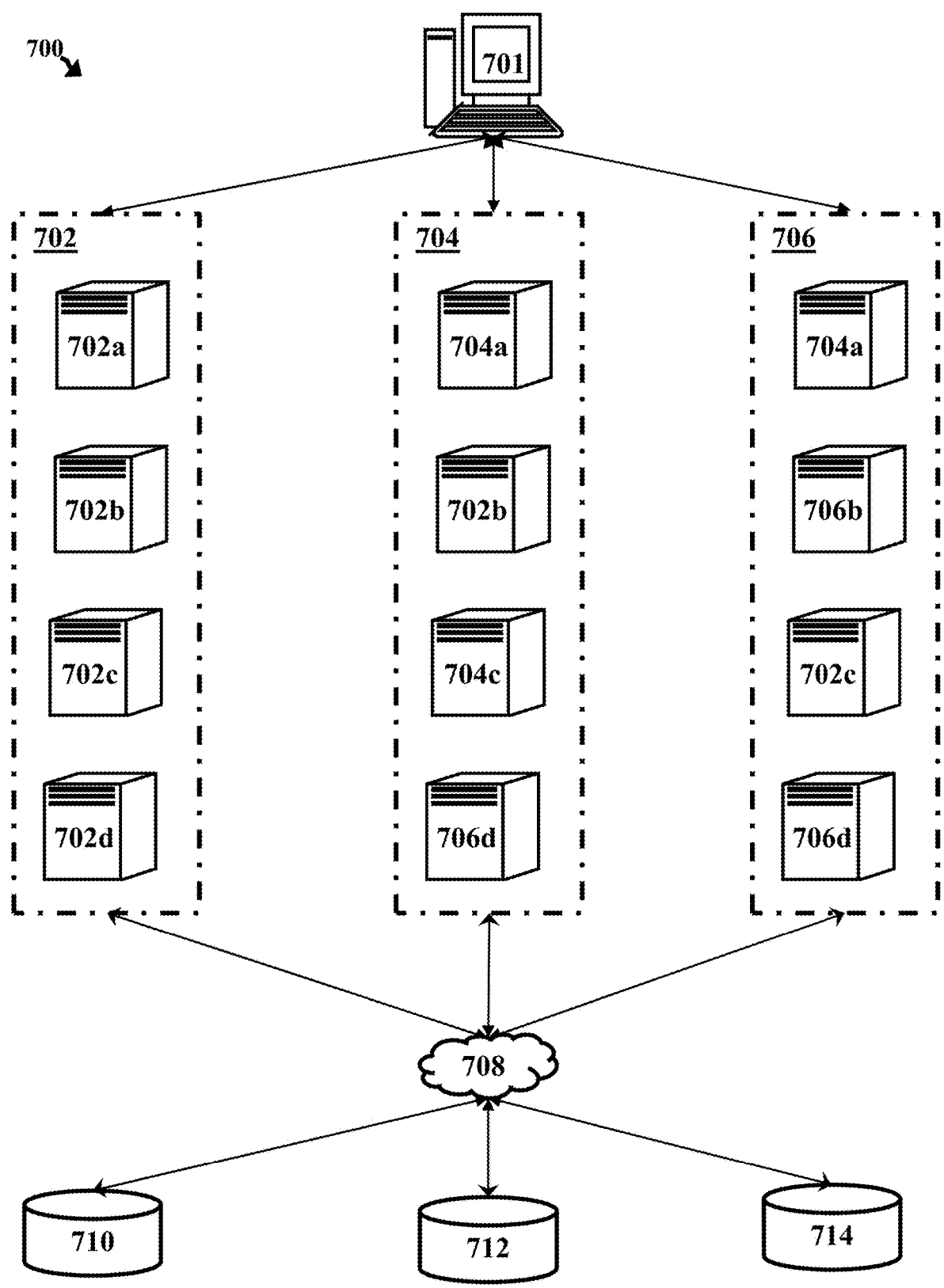
FIG. 7 illustrates a non-limiting example of the operation of the disclosed methods and systems, according to an embodiment.

FIG. 7 illustrates a non-limiting example of how the methods and systems described herein can be implemented to query biometric data and to verify a user's identify. In the example 700, an administrator operating the computing device 701 uses the methods and systems described herein to identify a user based on the user's biometric data.

The administrator may first input the user's biometric data using the computing device 701. For instance, the administrator may input the user's biometric data (e.g., fingerprint, retina scan/image, and/or facial recognition data) using a hardware device (e.g., finger print scanner, retina scanner, and/or facial recognition camera) in communication with the computing device 701. The computing device 701 queries the data stored in the databases 710-714 using the methods and systems described herein.

Conventionally, the computing device 701 would perform a simple query directly onto the databases 710-714. However, conventional systems require large computing power/resources to implement these queries. Therefore, efficient scalability is not possible using conventional processes. Furthermore, conventional querying methods may not produce timely results. Moreover, data stored in conventional databases is more susceptible to cyber-attacks and unauthorized access.

The computing device 701 may instruct a node within the distributed networks 702, 704, and/or 706 to query for results that match the inputted biometric data of the user. In some configurations, the computing device 701 may be a node within the distributed networks 702, 704, and/or 706. The distributed networks 702, 704, and/or 706 may represent private distributed networks that contain hashed biometric data of a set of users. For instance, the databases 710-714 may include fingerprint images, facial recognition data, and retina authentication data of a set of users and each distributed network may include a hashed value of the biometric data (stored within one or more databases).

As described above, instead of having one distributed network that contains all the biometric data, methods and systems described herein may allocate the data into multiple smaller distributed networks (e.g., distributed networks 702, 704, and/or 706). Each distributed network may correspond to one attribute. For example, distributed network 702 may correspond to biometric data for all US citizens, distributed network 704 may correspond to all Canadian citizens, and distributed network 706 may correspond to all users between ages 25-35. In some other embodiments, data may be segmented into different distributed networks based on various other attributes (e.g., users' demographic data, different departments who have vetted the data, different risk classes of users, private/public data). Different distributed networks may also have one or more nodes in common with others. For instance, as illustrated with respect to nodes 704a, 702c, and 702c, and 706d, different distributed networks 702, 704, and/or 706 may share one or more nodes.

Data segmentation may allow the data to be stored in silos, such that chances of unauthorized access may be minimized. Furthermore, various nodes may share (or not share) as much data with other distributed network as desired. For instance, distributed network 706 may become offline (e.g., stop participating in querying data) if desired.

The computing device 701 may send query instructions to all distributed networks 702, 704, and/or 706 in parallel. For instance, the commuting device 701 may only send the query instruction to the distrusted networks 704 and 706 because the user is purportedly Canadian and appears to be between ages 25-35. Therefore, the query steps may be performed simultaneously or near-simultaneously. Each distributed network may use the above-described methods to identify whether the user's biometric data matches existing data. When the biometric data matches existing biometric data, the computing device may retrieve biometric (and other) data associated with the user from the databases 710-714 (via network 708). The computing device may then display the data.

In some configurations, the computing device 701 may search hashing algorithms of each distributed networks 702, 704, and/or 706. The computing device 701 may then hash the biometric data received from the user based on the hashing algorithm of the distributed network 704 and 706. The computing device 701 may then send an instruction to the distributed networks 704 and 706 along with the respective hashed biometric data.

Figure 8:
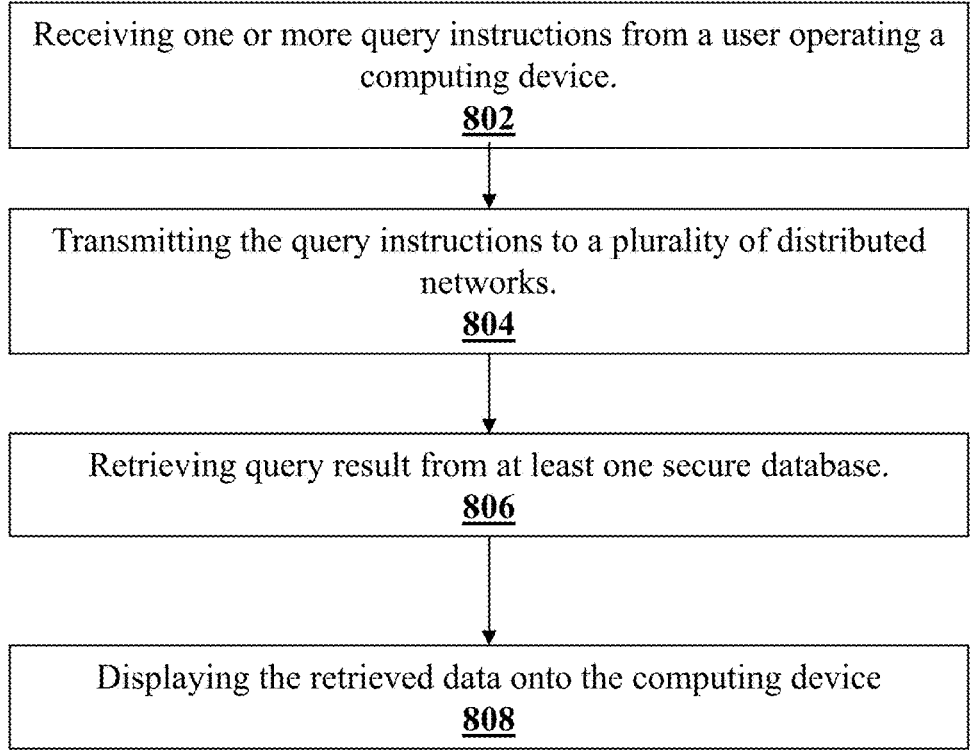
FIG. 8 illustrates a flow diagram of an illustrative method of accessing a database through a distributed access gateway, according to an embodiment.

FIG. 8 illustrates a flow diagram of an illustrative method 800 of accessing a database through a distributed access gateway, according to an embodiment. At step 802, a node within a distributed network may receive, from a user interacting with a computing device, an instruction to query data from at least one secure database within a plurality of secure databases.

A computing device may receive an instruction from a user to query data associated with a set of distributed networks. In an embodiment, a user interacting with the computing device may input biometric data using an input device (e.g., biometric) scanner or interact with an interface of the computing device. The user may also instruct the computing device to identify whether the user's biometric data matches any data existing and or indexed within the distributed networks.

At step 804, the node may transmit, to a plurality of distributed networks from a set of distributed networks, the query instruction, each distributed network configured to execute computer program instructions to validate one or more database operations of the plurality of secure databases interfacing the computing device, where each distributed network comprises, a plurality of distributed network nodes, each network node configured to store hashed data associated with a set of users, wherein the data is stored within the plurality of secure databases, and a first subset of the plurality the distributed network nodes configured to be validator nodes causing a corresponding processor to execute corresponding peer-to-peer clients to gossip with each other to co-operatively validate the one or more database operations and generate a new block; and a second subset of the plurality of distributed network nodes configured to be host nodes causing the corresponding processor to execute corresponding peer-to-peer clients update corresponding local copies of the new block generated by the validator nodes.

The computing device, which may be a node within at least one distributed network associated with biometric data stored in one or more databases may transmit the query instruction to one or more distributed networks. As described above, the computing device may identify one or more relevant distributed nodes to query and to identify whether the biometric data receive matches any existing data. As described above, for example in FIGS. 1-4, the distributed nodes may be hierarchical. For instance, one or more distributed networks may be structured, such that different nodes perform various tasks and are not equal to each other.

At step 806, the node may retrieve query result from at least one secure database. When at least one node within at least one distributed network identifies data that matches the biometric data received from the user (step 802), the computing device and/or the node that identified the matching data may retrieve the data from one or more databases.

At step 808, the node may display the retrieved data. The computing device may then display the data retrieved (step 806) for the user. For example, when the biometric data of the user matches a profile stored within at least one database, the computing device may display profile data (e.g., picture and demographic data) of the user.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A system comprising:
    a plurality of distributed networks, each distributed network configured to execute computer program instructions to validate one or more database operations of a plurality of secure databases interfacing at least one distributed network node, wherein each distributed network comprises:
        a plurality of distributed network nodes, each distributed network node configured to store hashed data associated with a set of users, wherein the data is stored within the plurality of secure databases;
        a first subset of the plurality the distributed network nodes configured to be validator nodes causing a corresponding processor to execute corresponding peer-to-peer clients to gossip with each other to co-operatively validate the one or more database operations and generate a new block; and
        a second subset of the plurality of distributed network nodes configured to be host nodes causing the corresponding processor to execute corresponding peer-to-peer clients to update corresponding local copies of the new block generated by the validator nodes after the new block has been generated by the validator nodes, wherein the host nodes are not configured to generate new blocks, and
    wherein each distributed network is connected to at least one other distributed network within the plurality of distributed networks.

2. The system of claim 1, wherein the hashing algorithm for at least one distributed network is different from the hashing algorithms used for other distributed networks.

3. The system of claim 1, wherein connected distributed networks comprise at least one common distributed network node between the connected distributed networks.

4. The system of claim 1, wherein the new block is generated based upon a proof of authority protocol.

5. The system of claim 1, wherein the one or more database operations include accessing a document from at least one or the plurality of secure databases.

6. The system of claim 5, wherein the one or more database operations include updating the document.

7. The system of claim 5, wherein at least one network node of the plurality of distributed network nodes is configured to:
    receive an access request for the document from a user device associated with a user;
    compare a permission level of the user with a permission level of the document; and
    provide the document for display on the user device in response to the network node determining that the permission level of the user is equal to or exceeds the permission level of the document.

8. The system of claim 7, wherein to provide the document for display on the user device, the network node is configured to:
    transmit the document to the user device.

9. The system of claim 7, wherein the network node is further configured to gossip information of the user accessing the document with at least another node of the plurality of distributed network nodes.

10. The system of claim 1, wherein at least one distributed network corresponds to a private blockchain.

11. A computer-implemented method comprising:
    receiving, by a computing device from a user interacting with the computing device, an instruction to query data from at least one secure database within a plurality of secure databases;
    transmitting, by the computing device to a plurality of distributed networks from a set of distributed networks, the query instruction, each distributed network configured to execute computer program instructions to validate one or more database operations of the plurality of secure databases interfacing the computing device, where each distributed network comprises:
        a plurality of distributed network nodes, each network node configured to store hashed data associated with a set of users, wherein the data is stored within the plurality of secure databases;
        a first subset of the plurality the distributed network nodes configured to be validator nodes causing a corresponding processor to execute corresponding peer-to-peer clients to gossip with each other to co-operatively validate the one or more database operations and generate a new block; and
        a second subset of the plurality of distributed network nodes configured to be host nodes causing the corresponding processor to execute corresponding peer-to-peer clients to update corresponding local copies of the new block generated by the validator nodes after the new block has been generated by the validator nodes, wherein the host nodes are not configured to generate new blocks;
    retrieving, by at least one network node within at least one distributed network, a query result from at least one secure database; and
    displaying, by the computing device, the retrieved data.

12. The method of 11, wherein the hashing algorithm for at least one distributed network is different from the hashing algorithms used for other distributed networks.

13. The method of claim 11, wherein connected distributed networks comprise at least one common distributed network node between the connected distributed networks.

14. The method of claim 11, wherein the new block is generated based upon a proof of authority protocol.

15. The method of claim 11, wherein the one or more database operations include accessing a document from at least one or the plurality of secure databases.

16. The method of claim 15, wherein the one or more database operations include updating the document.

17. The method of claim 15, wherein at least one network node of the plurality of distributed network nodes is configured to:
    receive an access request for the document from computing device;
    compare a permission level of the computing device with a permission level of the document; and
    provide the document for display on the computing device in response to the network node determining that the permission level of the computing device is equal to or exceeds the permission level of the document.

18. The method of claim 17, wherein the network node is further configured to gossip information of the user accessing the document with at least another node of the plurality of distributed network nodes.

19. The method of claim 11, wherein at least one distributed network corresponds to a private blockchain.

20. The method of claim 11, wherein the computing device is a biometric scanner.

\* \* \* \* \*